US011920109B2

(12) United States Patent
Dotzauer et al.

(10) Patent No.: US 11,920,109 B2
(45) Date of Patent: *Mar. 5, 2024

(54) HIGH ALKALINE WAREWASH DETERGENT WITH ENHANCED SCALE CONTROL AND SOIL DISPERSION

(71) Applicant: ECOLAB USA INC., Saint Paul, MN (US)

(72) Inventors: David Dotzauer, Saint Paul, MN (US); Timothy Meier, Saint Paul, MN (US); Carter M. Silvernail, Saint Paul, MN (US); John Mansergh, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,316

(22) Filed: May 20, 2022

(65) Prior Publication Data

US 2022/0282184 A1 Sep. 8, 2022

Related U.S. Application Data

(63) Continuation of application No. 16/947,279, filed on Jul. 27, 2020, now Pat. No. 11,339,354, which is a continuation of application No. 16/426,828, filed on May 30, 2019, now Pat. No. 10,745,651, which is a continuation of application No. 15/595,622, filed on May 15, 2017, now Pat. No. 10,316,272, which is a continuation of application No. 15/150,661, filed on May 10, 2016, now Pat. No. 9,683,203, which is a continuation of application No. 14/536,845, filed on Nov. 10, 2014, now Pat. No. 9,353,335.

(60) Provisional application No. 61/902,483, filed on Nov. 11, 2013.

(51) Int. Cl.

| | |
|---|---|
| ***C11D 3/37*** | (2006.01) |
| ***C11D 1/66*** | (2006.01) |
| ***C11D 3/10*** | (2006.01) |
| ***C11D 11/00*** | (2006.01) |

(52) U.S. Cl.

CPC .............. *C11D 3/3757* (2013.01); *C11D 1/66* (2013.01); *C11D 3/10* (2013.01); *C11D 3/3765* (2013.01); *C11D 11/0023* (2013.01)

(58) Field of Classification Search

CPC ....... C11D 3/3757; C11D 3/3765; C11D 1/66; C11D 3/10; C11D 11/0023

See application file for complete search history.

(56) References Cited

U.S. PATENT DOCUMENTS

| | | | | |
|---|---|---|---|---|
| 3,798,181 | A | | 3/1974 | Vazquez |
| 3,944,470 | A | | 3/1976 | Diehl et al. |
| 4,142,999 | A | | 3/1979 | Bloching et al. |
| 4,169,817 | A | | 10/1979 | Weber |
| 4,243,546 | A | | 1/1981 | Shaer |
| 4,261,868 | A | | 4/1981 | Hora et al. |
| 4,786,433 | A | | 11/1988 | Marquardt et al. |
| 4,826,618 | A | | 5/1989 | Borseth et al. |
| 4,842,758 | A | | 6/1989 | Crutzen |
| 4,842,767 | A | | 6/1989 | Warschewski et al. |
| 5,073,292 | A | | 12/1991 | Hessel et al. |
| 5,152,911 | A | | 10/1992 | Savio et al. |
| 5,159,210 | A | | 10/1992 | Eitrheim et al. |
| 5,185,039 | A | * | 2/1993 | Hamaguchi ............. C04B 24/32 106/711 |
| 5,279,756 | A | | 1/1994 | Savio et al. |
| 5,281,352 | A | * | 1/1994 | Savio ....................... C11D 3/10 510/229 |
| 5,331,512 | A | | 7/1994 | Orton |
| 5,356,800 | A | | 10/1994 | Jaquess |
| 5,468,411 | A | * | 11/1995 | Dixit ...................... C11D 17/06 435/219 |
| 5,545,348 | A | * | 8/1996 | Savio ....................... C11D 3/10 510/378 |
| 5,558,812 | A | | 9/1996 | Hahn et al. |
| 5,574,004 | A | | 11/1996 | Carr |
| 5,855,625 | A | | 1/1999 | Maurer et al. |

(Continued)

FOREIGN PATENT DOCUMENTS

| | | | |
|---|---|---|---|
| CA | 2163757 | C | 12/1994 |
| CA | 2326758 | | 5/2001 |

(Continued)

OTHER PUBLICATIONS

International Searching Authority, "The International Search Report and The Written Opinion" issued in connection with International Application No. PCT/US2014/064734, 15 pages, dated Feb. 24, 2015.

(Continued)

*Primary Examiner* — Nicole M. Buie-Hatcher
*Assistant Examiner* — M. Reza Asdjodi
(74) *Attorney, Agent, or Firm* — McKee, Voorhees & Sease, PLC

(57) ABSTRACT

Detergent compositions and methods of preparing and using the detergent compositions are disclosed. The detergent compositions comprise a polymer system comprising at least one polycarboxylic acid polymer, copolymer, or terpolymer, an alkalinity source comprising an alkali metal carbonate, a nonionic surfactant and water. The detergent compositions are suitable at alkaline pH and reduce or prevent scale formation, improve soil dispersion, and provide effective detergency.

16 Claims, No Drawings

(56) References Cited

U.S. PATENT DOCUMENTS

| | | | | | |
|---|---|---|---|---|---|
| 5,910,420 | A * | 6/1999 | Tuompo | C12Q 1/24 | 435/14 |
| 5,928,929 | A | 7/1999 | Outtrup et al. | | |
| 5,977,047 | A | 11/1999 | Carr | | |
| 5,981,457 | A * | 11/1999 | Ahmed | C11D 17/003 | 510/370 |
| 6,083,898 | A | 7/2000 | Meixner et al. | | |
| 6,191,092 | B1 | 2/2001 | Bragulla et al. | | |
| 6,239,091 | B1 * | 5/2001 | Tartakovsky | C11D 3/3769 | 510/288 |
| 6,302,122 | B1 * | 10/2001 | Parker | A61H 35/006 | 4/603 |
| 6,585,933 | B1 * | 7/2003 | Ehrhardt | C23F 11/149 | 422/11 |
| 6,777,530 | B1 | 8/2004 | Meixner et al. | | |
| 7,186,677 | B2 * | 3/2007 | Rahse | C11D 3/10 | 264/117 |
| 8,153,413 | B2 | 4/2012 | Lu et al. | | |
| 8,227,397 | B2 | 7/2012 | Herdt et al. | | |
| 8,262,804 | B2 | 9/2012 | Weber et al. | | |
| 8,383,572 | B2 | 2/2013 | Gizaw et al. | | |
| 8,680,034 | B2 | 3/2014 | Souter | | |
| 8,691,743 | B2 | 4/2014 | Kellar et al. | | |
| 8,753,861 | B2 | 6/2014 | Cacao-Pereira et al. | | |
| 9,353,335 | B2 * | 5/2016 | Dotzauer | C11D 11/0023 | |
| 2002/0028755 | A1 | 3/2002 | Van Dijk et al. | | |
| 2002/0151451 | A1 | 10/2002 | Barnabas et al. | | |
| 2003/0155087 | A1 * | 8/2003 | Sears | D21H 11/20 | 162/157.6 |
| 2005/0233920 | A1 * | 10/2005 | Stolte | C11D 17/0052 | 510/147 |
| 2007/0099807 | A1 * | 5/2007 | Smith | C11D 3/3765 | 510/180 |
| 2008/0004201 | A1 | 1/2008 | Boutique et al. | | |
| 2008/0242577 | A1 | 10/2008 | Becker et al. | | |
| 2008/0274928 | A1 * | 11/2008 | Smith | C23F 11/124 | 510/161 |
| 2009/0176687 | A1 * | 7/2009 | Tjelta | C11D 17/0065 | 524/556 |
| 2010/0190682 | A1 | 7/2010 | Lee et al. | | |
| 2010/0234265 | A1 | 9/2010 | Weber et al. | | |
| 2010/0294309 | A1 * | 11/2010 | Tropsch | C11D 3/378 | 134/18 |
| 2010/0323940 | A1 * | 12/2010 | Lentsch | C11D 3/364 | 510/225 |
| 2011/0136720 | A1 | 6/2011 | O'Connell et al. | | |
| 2011/0180112 | A1 | 7/2011 | Silvernail et al. | | |
| 2012/0045211 | A1 | 2/2012 | Tan et al. | | |
| 2012/0046211 | A1 | 2/2012 | Peters et al. | | |
| 2012/0053105 | A1 * | 3/2012 | Olson | C11D 3/0073 | 524/556 |
| 2012/0149625 | A1 | 6/2012 | Simonsen et al. | | |
| 2012/0240961 | A1 | 9/2012 | Denome et al. | | |
| 2012/0295830 | A1 | 11/2012 | Olson et al. | | |
| 2013/0045909 | A1 | 2/2013 | Silvernail et al. | | |
| 2013/0143297 | A1 | 6/2013 | Siegert et al. | | |
| 2013/0143787 | A1 | 6/2013 | Siegert et al. | | |
| 2014/0038878 | A1 | 2/2014 | O'Connell et al. | | |
| 2015/0133357 | A1 * | 5/2015 | Dotzauer | C11D 3/3765 | 510/218 |
| 2017/0247642 | A1 * | 8/2017 | Dotzauer | C11D 11/0023 | |
| 2019/0284506 | A1 * | 9/2019 | Dotzauer | C11D 11/0023 | |
| 2021/0009924 | A1 * | 1/2021 | Dotzauer | C11D 11/0023 | |
| 2022/0282184 | A1 * | 9/2022 | Dotzauer | C11D 11/0023 | |

FOREIGN PATENT DOCUMENTS

| | | | | |
|---|---|---|---|---|
| DE | 2015504 | | 10/1970 | |
| DE | 2038103 | | 2/1972 | |
| DE | 10106712 | A1 | 9/2002 | |
| EP | 0512371 | A2 | 4/1992 | |
| EP | 2201090 | B1 | 6/2010 | |
| JP | 2000169897 | A | 6/2000 | |
| JP | 200327095 | A | 1/2003 | |
| JP | 2003191781 | A | 7/2003 | |
| JP | 20079024 | A | 1/2007 | |
| JP | 200850410 | A | 3/2008 | |
| WO | 9203529 | A1 | 3/1992 | |
| WO | 9210605 | A1 | 6/1992 | |
| WO | WO-9412609 | A1 * | 6/1994 | C11D 10/04 |
| WO | 9429424 | A1 | 12/1994 | |
| WO | 9500635 | A1 | 1/1995 | |
| WO | 9830666 | A1 | 7/1998 | |
| WO | 9958633 | A1 | 11/1999 | |
| WO | 2007144855 | A1 | 12/2007 | |
| WO | 2008074402 | A1 | 6/2008 | |
| WO | 2009087540 | A1 | 7/2009 | |
| WO | 2013025541 | A1 | 2/2013 | |
| WO | 2013090559 | A1 | 6/2013 | |
| WO | 2014019680 | A1 | 2/2014 | |

OTHER PUBLICATIONS

Ecolab USA Inc., extended European Search Report for PCT/US2014/064734, dated Jun. 13, 2017.

* cited by examiner

HIGH ALKALINE WAREWASH DETERGENT WITH ENHANCED SCALE CONTROL AND SOIL DISPERSION

CROSS-REFERENCE TO RELATED APPLICATIONS

This application is a Continuation Application of U.S. Ser. No. 16/947,279, filed Jul. 27, 2020 which is a Continuation Application of U.S. Ser. No. 16/426,828, filed May 30, 2019, which is a Continuation Application of U.S. Ser. No. 15/595,622, filed May 15, 2017, now U.S. Pat. No. 10,316,272, issued on Jun. 11, 2019, which is a Continuation Application of U.S. Ser. No. 15/150,661, filed May 10, 2016, now U.S. Pat. No. 9,683,203, issued on Jun. 20, 2017, which is a Continuation Application of U.S. Ser. No. 14/536,845, filed Nov. 10, 2014, now U.S. Pat. No. 9,353,335, issued on May 31, 2016, which claims priority under 35 U.S.C. § 119 to Provisional Application U.S. Ser. No. 61/902,483, filed Nov. 11, 2013, all herein incorporated by reference in their entireties.

FIELD OF THE INVENTION

The invention relates to warewashing compositions and methods of using warewashing compositions. In particular, warewashing compositions and methods using warewashing compositions with high alkalinity to effectively inhibit and/or prevent scale formation and to improve soil dispersion.

BACKGROUND OF THE INVENTION

Detergent formulations employing alkali metal carbonates and/or alkali metal hydroxides are known to provide effective detergency, particularly when used with phosphorus-containing compounds. In particular, polyphosphates such as sodium tripolyphosphate and their salts are used in detergents because of their ability to prevent calcium carbonate precipitation and their ability to disperse and suspend soils. If calcium carbonate is allowed to precipitate, the crystals may attach to the surface being cleaned and cause undesirable effects. For example, calcium carbonate precipitation on the surface of ware can negatively impact the aesthetic appearance of the ware and give the ware an unclean look. In the laundering area, if calcium carbonate precipitates and attaches onto the surface of fabric, the crystals may leave the fabric feeling hard and rough to the touch. In addition to preventing the precipitation of calcium carbonate, the ability of sodium tripolyphosphate to disperse and suspend soils facilitates the detergency of the solution by preventing the soils from redepositing into the wash solution or wash water.

However, the use of phosphorous raw materials in detergents has become undesirable for a variety of reasons, including environmental reasons. This has resulted in heavy regulation of phosphorus emissions. Thus, industries are seeking alternative ways to control hard water scale formation associated with highly alkaline detergents. As noted above, many commercially-available detergent formulations have employed sodium tripolyphosphate as a cost effective warewashing detergent component f or controlling hard water scale and similar benefits. However, as formulations are adapted to contain less than 0.5 wt-% phosphorus, there is a need for identifying replacement water conditioning and cleaning components. Many non-phosphate replacement formulations result in heavy soil accumulation on hard surfaces such as glass, plastic, rubber and/or metal surfaces, or less effective detergency.

Attempts have been made to provide the benefits of effective detergency, improved scale control, and improved soil dispersion without the use of phosphorus-containing compounds; however, these solutions have not been as effective as desired. For example, Savio et al., U.S. Pat. No. 5,152,910, Savio et al., U.S. Pat. No. 5,152,911, Savio et al., U.S. Pat. No. 5,279,756, and Savio et al., U.S. Pat. No. 5,281,352 used low-phosphate machine dishwashing compositions comprising acrylic polymer and maleic anhydride/olefin copolymer. Savio et al., U.S. Pat. No. 5,5455,348 uses maleic acid homopolymer in a non-phosphate dishwashing detergent. Weber et al., U.S. Pat. No. 8,262,804 and Weber et al., E.P. No. 2,201,090 used phosphate-free dishwater detergent formulations containing a combination of hydrophobic modified polycarboxylates and hydrophilic modified polycarboxylates. Becker et al., U.S. Published Application No. 2008/0242577 employed hydrophobically modified polycarboxylates in rinsing agents. Van Boven et al., WO 2008/074402 uses polycarboxylic acid homopolymers and maleic acid or (meth)acrylic acid in soluble water softening compositions. Despite these efforts, effective warewash detergents having adequate scale control and soil dispersion with minimal or no phosphorus have not been developed.

Therefore, there is a need for detergent compositions, such as ware washing compositions, to provide adequate cleaning performance and preventing hard water scale accumulation while minimizing soil redeposition on a hard surfaces in contact with the detergent compositions. Similarly, there is a need for methods of reducing soil accumulation on a hard surface that avoids the use of phosphates.

Accordingly, it is an objective of the claimed invention to develop detergent compositions effective for reducing and/or substantially eliminating scale build up on hard surfaces while maintaining effective detergency.

A further object of the invention is to provide methods for employing alkaline detergents between pHs from about 9 to about 12.5 minimizing soil accumulation on hard surfaces.

A still further object of the invention is to employ alkaline detergents that are substantially free of phosphorus and exhibit improved control against hard water scale and prevent soil accumulation.

Other objects, advantages and features of the present invention will become apparent from the following specification taken in conjunction with the accompanying drawings.

BRIEF SUMMARY OF THE INVENTION

Detergent compositions and methods of preparing and using the detergent compositions are provided according to the invention. An advantage of the invention is that embodiments of the invention are substantially free of phosphorus and still provide effective detergency, reduced scale formation, and improved soil dispersion at high alkalinity.

In an embodiment, the present invention a detergent composition comprising a polymer system comprising at least one polycarboxylic acid polymer, copolymer, or terpolymer, an alkalinity source comprising an alkali metal carbonate, a nonionic surfactant and water. In an aspect of the invention, the detergent composition has an alkaline pH and reduces or prevents scale formation, improves soil dispersion, and provided effective detergency.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION OF THE PREFERRED EMBODIMENT

The present invention relates to warewash compositions and methods of use. The warewash compositions of the present invention have many advantages over existing warewash detergents. For example, the warewash compositions of the present invention employ a polymer system and provide effective detergency, reduce and even prevent scale formation, and provide improved soil dispersion.

The embodiments of this invention are not limited to particular warewash compositions or methods of use, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

An "antiredeposition agent" refers to a compound that helps keep suspended in water instead of redepositing onto the object being cleaned. Antiredeposition agents are useful in the present invention to assist in reducing redepositing of the removed soil onto the surface being cleaned.

As used herein, the term "cleaning" refers to a method used to facilitate or aid in soil removal, bleaching, microbial population reduction, and any combination thereof.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt %. More preferably, the amount of phosphorus is less than 0.1 wt-%, and most preferably the amount of phosphorus is less than 0.01 wt %.

As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Compositions

According to an embodiment of the invention, alkaline detergents incorporate a polymer system comprising polymaleic acid homopolymer, a polyacrylic acid copolymer, and a maleic anhydride/olefin copolymer. In an aspect, the alkaline detergents comprise, consist of and/or consist essentially of the polymer system and a source of alkalinity. In a further aspect, the alkaline detergents comprise, consist of and/or consist essentially of a polymer system comprising polymaleic acid homopolymer, a polyacrylic acid copolymer, and a maleic anhydride/olefin copolymer and an alkali metal hydroxide and/or an alkali metal carbonate. In still a further embodiment the detergent compositions of the invention can comprise, consist of, and/or consist essentially of a polymer system, alkalinity source, water, and a nonionic surfactant. Embodiments of the invention may be substantially free of phosphorus. Moreover, embodiments of the invention that are substantially free of phosphorus provide substantially similar cleaning performance to a method employing a phosphorus-containing detergent.

Examples of suitable formulations for concentrated detergent compositions according to the invention are shown below in Table 1:

TABLE 1

| Ingredient | First Exemplary Range (wt. %) | Second Exemplary Range (wt. %) | Third Exemplary Range (wt. %) |
|---|---|---|---|
| Polymer System | 0-20 | 0.01-15 | 1-10 |
| Alkalinity Source | 50-99 | 55-95 | 60-85 |
| Nonionic Surfactant | 0-15 | 0.01-10 | 1-8 |
| Water | 0-20 | 0.01-15 | 1-10 |

In particular embodiments of the invention, the detergent compositions can be diluted to use solutions. When diluted to a use solution, the detergent compositions may be present between about 10 ppm and about 10,000 ppm, preferably between about 200 ppm and about 5000 ppm, more preferably between about 500 ppm and about 2000 ppm, and in a most preferred embodiment between about 750 ppm and about 1500 ppm. An example of a suitable detergent use solution composition for use according to the invention may comprise, consist and/or consist essentially of about from about 10-4000 ppm of an alkalinity source, from about 1-500 ppm of a polymer system, and from about 1-400 nonionic surfactant.

Polymer System

The present invention includes a polymer system comprised of at least one polycarboxylic acid polymer, copolymer, and/or terpolymer. In a preferred embodiment, the polymer system comprises at least two polycarboxylic acid polymers, copolymers, and/or terpolymers. In a most preferred embodiment, the polymer system comprises at least three polycarboxylic acid polymers, copolymers, and/or terpolymers. Particularly suitable polycarboxylic acid polymers of the present invention, include, but are not limited to, polymaleic acid homopolymers, polyacrylic acid copolymers, and maleic anhydride/olefin copolymers.

Polymaleic acid $(C_4H_2O_3)x$ or hydrolyzed polymaleic anhydride or cis-2-butenedioic acid homopolymer, has the structural formula:

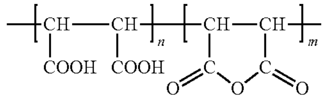

where n and m are any integer. Examples of polymaleic acid homopolymers, copolymers, and/or terpolymers (and salts thereof) which may be used for the invention are particularly preferred are those with a molecular weight of about 0 and about 5000, more preferably between about 200 and about 2000 (can you confirm these MWs). Commercially available polymaleic acid homopolymers include the Belclene 200 series of maleic acid homopolymers from BWA™ Water Additives, 979 Lakeside Parkway, Suite 925 Tucker, GA 30084, USA and Aquatreat AR-801 available from AkzoNobel. The polymaleic acid homopolymers, copolymers, and/or terpolymers may be present in the polymer system from about 25 wt. % to about 55 wt. %, about 30 wt. % to about 50 wt., or about 35 wt. % to about 47 wt. %

The detergent compositions of the present invention can use polyacrylic acid polymers, copolymers, and/or terpolymers. Poly acrylic acids have the following structural formula:

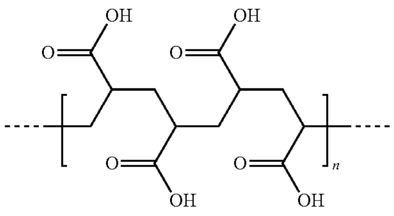

where n is any integer. Examples of suitable polyacrylic acid polymers, copolymers, and/or terpolymers, include but are not limited to, the polymers, copolymers, and/or terpolymers of polyacrylic acids, $(C_3H_4O_2)_n$ or 2-Propenoic acid, acrylic acid, polyacrylic acid, propenoic acid.

In an embodiment of the present invention, particularly suitable acrylic acid polymers, copolymers, and/or terpolymers have a molecular weight between about 100 and about 10,000, in a preferred embodiment between about 500 and about 7000, in an even more preferred embodiment between about 1000 and about 5000, and in a most preferred embodiment between about 1500 and about 3500. Examples of polyacrylic acid polymers, copolymers, and/or terpolymers (or salts thereof) which may be used for the invention include, but are not limited to, Acusol 448 and Acusol 425 from The Dow Chemical Company, Wilmington Delaware, USA. In particular embodiments it may be desirable to have acrylic acid polymers (and salts thereof) with molecular weights greater than about 10,000. Examples, include but are not limited to, Acusol 929 (10,000 MW) and Acumer 1510 (60,000 MW) both also available from Dow Chemical, AQUATREAT AR-6 (100,000 MW) from AkzoNobel Strawinskylaan 2555 1077 ZZ Amsterdam Postbus 75730 1070 AS Amsterdam. The polyacrylic acid polymer, copolymer, and/or terpolymer may be present in the polymer system from about 25 wt. % to about 55 wt. %, about 30 wt. % to about 50 wt., or about 35 wt. % to about 47 wt. %.

Maleic anhydride/olefin copolymers are copolymers of polymaleic anhydrides and olefins. Maleic anhydride (C2H2 (CO)2O has the following structure:

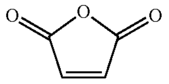

A part of the maleic anhydride can be replaced by maleimide, N-alkyl($C_{1-4}$) maleimides, N-phenyl-maleimide, fumaric acid, itaconic acid, citraconic acid, aconitic acid, crotonic acid, cinnamic 10 acid, alkyl ($C_{1-18}$) esters of the foregoing acids, cycloalkyl($C_{3-8}$) esters of the foregoing acids, sulfated castor oil, or the like. At least 95 wt % of the maleic anhydride polymers, copolymers, or terpolymers have a number average molecular weight of in the range between about 700 and about 20,000, preferably between about 1000 and about 100,000.

A variety of linear and branched chain alpha-olefins can be used for the purposes of this invention. Particularly useful alpha-olefins are dienes containing 4 to 18 carbon atoms, such as butadiene, chloroprene, isoprene, and 2-methyl-1,5-hexadiene; 1-alkenes containing 4 to 8 carbon atoms, preferably $C_{4-10}$, such as isobutylene, 1-butene, 1-hexene, 1-octene, and the like.

In an embodiment of the present invention, particularly suitable maleic anhydride/olefin copolymers have a molecular weight between about 1000 and about 50,000, in a preferred embodiment between about 5000 and about 20,000, and in a most preferred embodiment between about 7500 and about 12,500. Examples of maleic anhydride/olefin copolymers which may be used for the invention include, but are not limited to, Acusol 460N from The Dow Chemical Company, Wilmington Delaware, USA. The maleic anhydride/olefin copolymer may be present in the polymer system from about 5 wt. % to about 35 wt. %, about 7 wt. % to about 30 wt., or about 10 wt. % to about 25 wt. %.

In general, it is expected that the compositions will include the polymer system in an amount between about 0 wt. % and about 20 wt. %, between about 0.01 wt. % and about wt. %, and between about 1 wt. % and about 10 wt. %. The polymer system of the present invention can comprise, consist essentially of, or consist of at least one polymaleic acid homopolymer, copolymer, and/or terpolymer; at least one polyacrylic acid polymer, copolymer, and/or terpolymer; and at least one maleic anhydride/olefin copolymer. In an embodiment of the invention, the polymer system comprises at least one polymaleic acid homopolymer, copolymer, and/or terpolymer; at least one polyacrylic acid polymer, copolymer, and/or terpolymer; and at least one maleic anhydride/olefin copolymer in a ratio relationship between about 1:1:1 and about 2:2:1, or between about 2:2:1 and about 3:3:1. In addition, without being limited according to the invention, all ranges for the ratios recited are inclusive of the numbers defining the range and include each integer within the defined range of ratios.

The polymer system can be in an amount sufficient to provide a desired level of scale control and soil dispersion when used in the use solution. There should be sufficient amount of polymer system to provide the desired scale control inhibiting effect. It is expected that the upper limit on the polymer system will be determined by solubility. In a preferable embodiment, the polymer system is present in a use solution at between about 1 ppm and 500 ppm, more preferably between about 10 ppm and 100 ppm, and most preferably between about 20 ppm and about 50 ppm.

Alkalinity Source

The composition can include an effective amount of one or more alkalinity sources. An effective amount of one or more alkaline sources should be considered as an amount that provides a composition having a pH between about 7 and about 14. In a particular embodiment the detergent composition will have a of between about 7.5 and about 13.5. In a particular embodiment the detergent composition will have a of between about 8 and about 13. During the wash cycle the use solution will have a pH between about 8 and about 13. In particular embodiments, the use solution will have a pH between about 9 and 11. When the detergent composition includes an enzyme composition, the pH may be modulated to provide the optimal pH range for the enzyme compositions effectiveness. In a particular embodiment of the invention incorporating an enzyme composition in the detergent composition, the optimal pH is between about 10 and about 11.

Examples of suitable alkaline sources of the detergent composition include, but are not limited to carbonate-based alkalinity sources, including, for example, carbonate salts such as alkali metal carbonates; caustic-based alkalinity sources, including, for example, alkali metal hydroxides; other suitable alkalinity sources may include metal silicate, metal borate, and organic alkalinity sources. Exemplary alkali metal carbonates that can be used include, but are not limited to, sodium carbonate, potassium carbonate, bicarbonate, sesquicarbonate, and mixtures thereof. Exemplary alkali metal hydroxides that can be used include, but are not limited to sodium, lithium, or potassium hydroxide. Exemplary metal silicates that can be used include, but are not limited to, sodium or potassium silicate or metasilicate. Exemplary metal borates include, but are not limited to, sodium or potassium borate.

Organic alkalinity sources are often strong nitrogen bases including, for example, ammonia (ammonium hydroxide), amines, alkanolamines, and amino alcohols. Typical examples of amines include primary, secondary or tertiary amines and diamines carrying at least one nitrogen linked hydrocarbon group, which represents a saturated or unsaturated linear or branched alkyl group having at least 10 carbon atoms and preferably 16-24 carbon atoms, or an aryl, aralkyl, or alkaryl group containing up to 24 carbon atoms, and wherein the optional other nitrogen linked groups are formed by optionally substituted alkyl groups, aryl group or aralkyl groups or polyalkoxy groups. Typical examples of alkanolamines include monoethanolamine, monopropanolamine, diethanolamine, dipropanolamine, triethanolamine, tripropanolamine and the like. Typical examples of amino alcohols include 2-amino-2-methyl-1-propanol, 2-amino-1-butanol, 2-amino-2-methyl-L3-propanediol, 2-amino-2-ethyl-1,3-propanediol, hydroxymethyl aminomethane, and the like.

In general, alkalinity sources are commonly available in either aqueous or powdered form, either of which is useful in formulating the present detergent compositions. The alkalinity may be added to the composition in any form known in the art, including as solid beads, granulated or particulate form, dissolved in an aqueous solution, or a combination thereof.

In general, it is expected that the compositions will include the alkalinity source in an amount between about 50% and about 99% by weight, between about 55% and about 95% by weight, and between about 60% and about 85% by weight of the total weight of the detergent composition. When diluted to a use solution, the compositions of the present invention can include between about 10 ppm and about 4000 ppm of an alkalinity source, preferably between about 100 ppm and about 1500 ppm, most preferably between about 500 ppm and 1000 ppm.

Nonionic Surfactant

In some embodiments, the compositions of the present invention include about 0 wt. % to about 15 wt. % of a non-ionic surfactant. In other embodiments the compositions of the present invention include about 2 wt. % to about 10 wt. % of a non-ionic surfactant. In still yet other embodiments, the compositions of the present invention include about 5 wt. % of a non-ionic surfactant. In some embodiments, the compositions of the present invention include about 20 ppm to about 400 ppm of a non-ionic surfactant.

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Tetronic® compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

3. Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol™ manufactured by Shell Chemical Co. and Alfonic™ manufactured by Vista Chemical Co.

4. Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol™ manufactured by Henkel Corporation and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

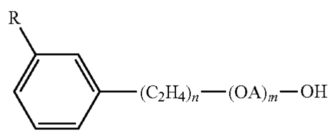

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n\ (C_2H_6O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n\ (C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n\ (C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $—(C_2H_4O)xH$, where x is in the range of from 1 to 3.

13. A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}—(PO)_SN\text{-}(EO)_tH$, $R^{20}—(PO)_SN\text{-}(EO)_tH(EO)_tH$, and $R^{20}—N(EO)_tH$; in which $R^{20}$ is an alkyl, alkenyl or other aliphatic group, or an alkyl-aryl group of from 8 to preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}—(PO)v\text{-}N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

14. Amine oxides are tertiary amine oxides corresponding to the general formula:

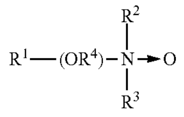

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

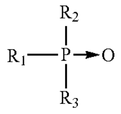

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

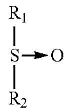

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 ($R-(EO)_5(PO)_4$) and Dehypon LS-36 ($R-(EO)_3(PO)_6$); and capped alcohol alkoxylates, such as Plurafac LF221 and Tegoten EC11; mixtures thereof, or the like.

Water

The embodiments of the invention many include water. Those of skill in the art will be capable of selecting the grade of water desired with the desired level of water hardness and grain. When water is included in the compositions of the present invention, it can comprise between about 0 wt. % and about 20 wt. %, preferably between about 0.01 wt. % and about 15 wt. %, more preferably between about 1 wt. % and about 10 wt. %, most preferably between about 2.5 wt. % and about 7.5 wt. %. In a use solution, the majority of the solution will comprise water, preferably greater than 90 wt. %, more preferably greater than 95 wt. %, and most preferably 99 wt. % or greater.

Additional Ingredients

The components of the detergent composition can further be combined with various functional components suitable for use in ware wash applications. In some embodiments, the detergent composition including the polymer system, water, alkalinity source, and nonionic surfactant make up a large amount, or even substantially all of the total weight of the detergent composition. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically ware wash applications or laundry applications. However, other embodiments may include functional ingredients for use in other applications.

Compositions and methods according to the invention using a detergent composition may further comprise additional components to be used in combination with the polymer system, nonionic surfactant, and alkalinity source. Additional components which can be incorporated into the detergent composition and use solution and/or added independently to the water source include for example, solvents, dyes, fragrances, anti-redeposition agents, solubility modifiers, dispersants, rinse aids, corrosion inhibitors, buffering agents, defoamers, enzymes, enzyme stabilizers, antimicrobial agents, preservatives, chelators, bleaching agents, bleaching activators, antimicrobial activators, additional stabilizing agents, and combinations of the same.

Enzymes

Optionally, the detergent compositions and methods of use according to the invention can include enzyme compositions. which provide enzymes for enhanced removal of soils, prevention of redeposition and additionally the reduction of foam in use solutions of the cleaning compositions. The purpose of the enzyme composition is to break down adherent soils, such as starch or proteinaceous materials, typically found in soiled surfaces and removed by a detergent composition into a wash water source. The enzyme compositions remove soils from substrates and prevent redeposition of soils on substrate surfaces. Enzymes provide additional cleaning and detergency benefits, such as antifoaming. Without being limited to a particular mechanism of action according to the detergency of the use solutions according to the invention, the enzymes in the detergent use solutions beneficially enhance removal of soils, in particular protein removal with the use of protease enzymes, prevent redeposition of soils, and reduce foaming, including for example foam height in use solutions of the detergent and enzyme compositions. The combined benefits of a low-foaming, detersive enzyme use solution allows both the extended lifetime of the sump water for use in warewash application and the improved cleaning of ware (and other articles).

Exemplary types of enzymes which can be incorporated into detergent compositions or detergent use solutions include amylase, protease, lipase, cellulase, cutinase, gluconase, peroxidase and/or mixtures thereof. An enzyme composition according to the invention may employ more than one enzyme, from any suitable origin, such as vegetable, animal, bacterial, fungal or yeast origin. However, according to a preferred embodiment of the invention, the enzyme is a protease.

As one skilled in the art shall ascertain, enzymes are designed to work with specific types of soils. For example, according to an embodiment of the invention, ware wash applications may use a protease enzyme as it is effective at the high temperatures of the ware wash machines and is effective in reducing protein-based soils. Protease enzymes are particularly advantageous for cleaning soils containing protein, such as blood, cutaneous scales, mucus, grass, food (e.g., egg, milk, spinach, meat residue, tomato sauce), or the like. Protease enzymes are capable of cleaving macromolecular protein links of amino acid residues and convert substrates into small fragments that are readily dissolved or dispersed into the aqueous use solution. Proteases are often referred to as detersive enzymes due to the ability to break soils through the chemical reaction known as hydrolysis. Protease enzymes can be obtained, for example, from *Bacillus subtilis, Bacillus licheniformis* and *Streptomyces griseus*. Protease enzymes are also commercially available as serine endoproteases.

Examples of commercially-available protease enzymes are available under the following trade names: Esperase, Purafect, Purafect L, Purafect Ox, Everlase, Liquanase, Savinase, Prime L, Prosperase and Blap.

According to the invention, the enzyme composition may be varied based on the particular cleaning application and the types of soils in need of cleaning. For example, the temperature of a particular cleaning application will impact the enzymes selected for an enzyme composition according to the invention. Ware wash applications, for example, clean substrates at temperatures in excess of approximately 60° C., or in excess of approximately 70° C., or between approximately 65°-80° C., and enzymes such as proteases are desirable due to their ability to retain activity at such elevated temperatures.

The enzyme compositions according to the invention may be an independent entity and/or may be formulated in combination with the detergent compositions. According to an embodiment of the invention, an enzyme composition may be formulated into the detergent compositions in either liquid or solid formulations. In addition, enzyme compositions may be formulated into various delayed or controlled release formulations. For example, a solid molded detergent composition may be prepared without the addition of heat. As a skilled artisan will appreciate, enzymes tend to become denatured by the application of heat and therefore use of enzymes within detergent compositions require methods of forming a detergent compositions that does not rely upon heat as a step in the formation process, such as solidification.

The enzyme composition may further be obtained commercially in a solid (i.e., puck, powder, etc.) or liquid formulation. Commercially-available enzymes are generally combined with stabilizers, buffers, cofactors and inert vehicles. The actual active enzyme content depends upon the method of manufacture, which is well known to a skilled artisan and such methods of manufacture are not critical to the present invention.

Alternatively, the enzyme composition may be provided separate from the detergent composition, such as added directly to the wash liquour or wash water of a particular application of use, e.g., dishwasher.

Additional description of enzyme compositions suitable for use according to the invention is disclosed for example in U.S. Pat. Nos. 7,670,549, 7,723,281, 7,670,549, 7,553,806, 7,491,362, 6,638,902, 6,624,132, and 6,197,739 and U.S. Patent Publication Nos. 2012/0046211 and 2004/0072714, each of which are herein incorporated by reference in its entirety. In addition, the reference "Industrial Enzymes", Scott, D., in Kirk-Othmer Encyclopedia of Chemical Technology, 3rd Edition, (editors Grayson, M. and EcKroth, D.) Vol. 9, pp. 173-224, John Wiley & Sons, New York, 1980 is incorporated herein in its entirety.

Stabilizing Agents

The detergent compositions of the present invention may further include stabilizers (referred to herein as stabilizing agent(s)) which may be dispensed manually or automatically into a use solution of the detergent composition to stabilize an enzyme from loss of activity (i.e. retain proteolytic activity or enzymatic retention under the alkaline and high temperature conditions). In a preferred embodiment, a stabilizing agent and enzyme are formulated directly into the detergent composition according to the invention. The formulations of the detergent composition may vary based upon the particular enzymes and/or stabilizing agents employed. Starch-based and/or protein-based stabilizing agents are preferred stabilizing agents. In embodiments including an enzyme stabilizer, the stabilizing agent is a starch, poly sugar, amine, amide, polyamide or poly amine. In still further aspects, the stabilizing agent may be a combination of any of the aforementioned stabilizing agents.

Protein Stabilizing Agents

In an embodiment, the stabilizing agent may include a nitrogen-containing group, including a quaternary nitrogen group to increase the stability of the enzyme. In a preferred aspect, the stabilizing agent is a proteinaceous material. A protein or proteinaceous material can include casein, gelatin, collagen, or the like. In an embodiment, the protein stabilizing agent is present in a use solution at a concentration from about 100-2000 ppm actives, preferably about 100-2000 ppm actives, or more preferably from about 100-1000 ppm actives. In an embodiment, the stabilizing agent to enzyme ratio is from about 10:1 to about 200:1, or from about 10:1 to about 100:1.

In an aspect, the protein stabilizing agents have an average molecular weight from about 10,000 to 500,000, from about 30,000 to 250,000, or from about 50,000 to 200,000 (such as for casein). Exemplary proteins suitable for use according to the invention include, for example, casein and gelatin. Combinations of such exemplary proteins may also be used according to the invention. A commercially-available example is Amino 1000 (GNC) providing a combination of caseinate and gelatin proteins along with other ingredients, such as Vitamin E and soy lecithin. In some aspects, the protein stabilizing agents do not include small molecule amino acids having molecular weights below the identified ranges set forth herein.

In an aspect, the protein stabilizing agents may be soluble or dispersible in water. In a further aspect, the protein stabilizing agents may include denatured or unraveled proteins. Various commercially-available proteins (e.g. casein) are sold as powders and exist as long chemical chains Commercially as powders, the protein chains fold upon themselves and form hydrogen bonds holding the protein in a globular form. In an aspect, the unravelling or denaturing the protein forms a more random structure and can be achieved by methods known in the art, such as boiling in water. In an aspect, the denatured proteins are employed for enzyme stability.

In an aspect, the protein stabilizing agent can also include a protein hydrolysate, a polypeptide, or a natural or synthetic analog of a protein hydrolysate or polypeptide. The term "hydrolysate" refers to any substance produced by hydrolysis, without being limited to a particular substance produced by any specific method of hydrolysis. The term is intended to include "hydrolysates" produced by enzymatic as well as non-enzymatic reactions. "Protein hydrolysate" refers to a hydrolysate produced by hydrolysis of a protein of any type or class, which also may be produced by enzymatic or non-enzymatic methods. Exemplary protein hydrolysates may include: protein hydrolysate from wheat gluten, soy protein acid hydrolysate, casein acid hydrolysate from bovine milk, and the like.

In an aspect, the protein stabilizing agents are not antimicrobial agents, such as amines. The amine refers to primary, secondary, or tertiary amines. In an aspect, the protein stabilizing agents are not antimicrobial amines and/or quaternary ammonium compounds.

Starch-Based Stabilizing Agent

In an embodiment, the stabilizing agent may include a starch-based stabilizing agent and optionally an additional food soil component (e.g. fat and/or protein to modify the starch-based stabilizing agent). In an aspect, the stabilizing agent is a starch, polysaccharide, or poly sugar. In an embodiment, the starch stabilizing agent is present in a use solution at a concentration from about 10-2000 ppm actives, preferably about 100-2000 ppm actives, or more preferably from about 100-1000 ppm actives. In an embodiment, the stabilizing agent to enzyme ratio is from about 10:1 to about 200:1, or from about 10:1 to about 100:1.

Starches are suitable stabilizing agents according to the invention. Starches refer to food reserve materials from plants and/or animals. Starches contain two primary polysaccharide components, the linear species amylose and the highly branched species amylopectin.

Polysaccharides are suitable stabilizing agents according to the invention. As referred to herein, polysaccharides are high molecular weight carbohydrates, including for example, condensation polymers of monosaccharide residues, most commonly five or more monosaccharide residues. Polysaccharides may be substituted or substituted, and/or branched or linear and have α linkages and/or β linkages or bonds between the saccharide monomers (e.g. glucose, arabinose, mannose, etc.).

In an aspect, the polysaccharides have a terminal group with α-1,4 linked substituted or substituted glucose monomers, anhydroglucose monomers, terminal anhydroglucose monomers, or combinations thereof. A used herein "terminal" means the monomer or group of monomers present on an end or terminal portion of a polysaccharide. All polysaccharides as described herein have at least two terminal portions, with unsubstituted linear polysaccharides having two terminal portions, substituted linear polysaccharides having at least two terminal portions, and substituted or unsubstituted, branched polysaccharides having at least three terminal portions.

In another aspect, the polysaccharides have a terminal group with at least three α-1,4 linked substituted or unsubstituted glucose monomers, anhydroglucose monomers, terminal anhydroglucose monomers, or combinations thereof.

In an embodiment, the polysaccharide enzyme stabilizer is a homo or hetero polysaccharide, such as, a polysaccharide comprising only α-linkages or bonds between the saccharide monomers. By α-linkages between the saccharide monomers it is understood to have its conventional meaning, that is the linkages between the saccharide monomers are of the a anomer, such as for example, the disaccharide (+) maltose or 4-O-(α-D-glucopyranosyl)-D-glucopyranose, the disaccharide (+)-cellobiose or 4-O-((β-D-Glucopyranosyl)-D-glucopyranose.

In another aspect, the polysaccharide enzyme stabilizer is a homo or hetero polysaccharide, and may comprise only glucose monomers, or a polysaccharide comprising only glucose monomers wherein a majority of the glucose monomers are linked by α-1,4 bonds. Glucose is an aldohexose or a monosaccharide containing six carbon atoms. It is also a reducing sugar (e.g. glucose, arabinose, mannose, etc, most disaccharides, i.e., maltose, cellobiose and lactose).

In another embodiment, the polysaccharide enzyme stabilizer is a substituted or unsubstituted glucose monomer having any ratio of α-1,4 linked monomers to α-1,6 linked monomers. Accordingly, the glucose monomer may be connected to the polysaccharide chain via any suitable location (e.g. 1, 4 or 6 position). The number of α-1,4, α-1,6, α-1,3, α-2,6 bonds can be determined by examining the $^1$H NMR spectra (proton NMR) of any particular enzyme stabilizer.

Poly sugars are suitable stabilizing agents according to the invention. Beneficially, poly sugars are biodegradable and often classified as Generally Recognized As Safe (GRAS).

Exemplary stabilizing agents include, but are not limited to: amylose, amylopectin, pectin, inulin, modified inulin, potato starches (e.g. potato buds/flakes), modified potato starch, corn starch, modified corn starch, wheat starch, modified wheat starch, rice starch, modified rice starch, cellulose, modified cellulose, dextrin, dextran, maltodextrin, cyclodextrin, glycogen, oligofructose and other soluble or partially soluble starches. Particularly suitable stabilizing agents include, but are not limited to: inulin, carboxymethyl inulin, potato starch, sodium carboxymethylcellulose, linear sulfonated alpha-(1,4)-linked D-glucose polymers, cyclodextrin and the like. Combinations of stabilizing agents may also be used according to embodiments of the invention. Modified stabilizing agents may also be used wherein an additional food soil component is combined with the stabilizing agent (e.g. fat and/or protein).

In an embodiment, the starch-based stabilizing agent is an amylopectin and/or amylose containing starch. In a further embodiment, the stabilizing agent is a potato starch. In a still further embodiment, the starch-based stabilizing agent is an amylopectin and/or inulin containing starch, such as a potato starch that is modified (e.g. combined) with a protein.

Stabilizing Agent Formulations

The stabilizing agents according to the invention may be an independent entity and/or may be formulated in combination with the detergent composition. According to an embodiment of the invention, a stabilizing agent may be formulated into a detergent composition (with or without the enzyme) in either liquid or solid formulations. In addition, stabilizing agent compositions may be formulated into various delayed or controlled release formulations. For example, a solid molded detergent composition may be prepared without the addition of heat. Alternatively, the stabilizing agent may be provided separate from the detergent, such as added directly to the wash liquor or wash water of a particular application of use, e.g. dishwasher.

In an embodiment utilizing an enzyme and stabilizing agent, is preferred that the stabilizing agent is formulated into a concentrated solid detergent with enzymes. In preferred aspects, the stabilizing agents provide the only stabilization required for the enzymes in the detergent formulations. In such a preferred aspect no other stabilizing agents are employed, such as for example any one or more of the following stabilizing agents: boron compounds (e.g. borax, boric oxide, alkali metal borates, boric acid esters, alkali metal salts of boric acid, and the like), and calcium compounds. In a preferred embodiment employing a stabilizing agent, the stabilizing agents and detergent compositions are free of boric acid or a boric acid salt.

Additional Enzyme Stabilizers

One skilled in the art will ascertain suitable enzyme stabilizers and/or stabilizing systems for enzyme compositions suitable for use according to the invention, such as those described, for example, in U.S. Pat. Nos. 7,569,532 and 6,638,902, which are incorporated herein in their entirety. According to an embodiment of the invention, an enzyme stabilizing system may include a mixture of carbonate and bicarbonate and can also include other ingredients to stabilize certain enzymes or to enhance or maintain the effect of the mixture of carbonate and bicarbonate. An enzyme stabilizer may further include boron compounds or calcium salts. For example, enzyme stabilizers may be boron compounds selected from the group consisting of boronic acid, boric acid, borate, polyborate and combinations thereof.

Enzyme stabilizers may also include chlorine bleach scavengers added to prevent chlorine bleach species present from attacking and inactivating the enzymes especially under alkaline conditions. Therefore, suitable chlorine scavenger anions may be added as an enzyme stabilizer to prevent the deactivation of the enzyme compositions according to the invention. Exemplary chlorine scavenger anions include salts containing ammonium cations with sulfite, bisulfate, thiosulfite, thiosulfate, iodide, etc. Antioxidants such as carbamate, ascorbate, etc., organic amines such as ethylenediaminetetracetic acid (EDTA) or alkali metal salt thereof, monoethanolamine (MEA), and mixtures thereof can also be used.

Rinse Aids

The detergent compositions can optionally include a rinse aid composition, for example a rinse aid formulation containing a wetting or sheeting agent combined with other optional ingredients in a solid composition. The rinse aid components are capable of reducing the surface tension of the rinse water to promote sheeting action and/or to prevent spotting or streaking caused by beaded water after rinsing is complete, for example in warewashing processes. Examples of sheeting agents include, but are not limited to: polyether compounds prepared from ethylene oxide, propylene oxide, or a mixture in a homopolymer or block or heteric copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule. When a rinse aid composition is used, it can be present at about 1 to about 5 milliliters per cycle, wherein one cycle includes about 6.5 liters of water.

Thickening Agents

Thickeners useful in the present invention include those compatible with alkaline systems. The viscosity of the detergent composition increases with the amount of thickening agent, and viscous compositions are useful for uses where the detergent composition clings to the surface. Suitable thickeners can include those which do not leave contaminating residue on the surface to be treated. Generally, thickeners which may be used in the present invention include natural gums such as xanthan gum, guar gum, modified guar, or other gums from plant mucilage; polysaccharide based thickeners, such as alginates, starches, and cellulosic polymers (e.g., carboxymethyl cellulose, hydroxyethyl cellulose, and the like); polyacrylates thickeners; and hydrocolloid thickeners, such as pectin. Generally, the concentration of thickener employed in the present compositions or methods will be dictated by the desired viscosity within the final composition. However, as a general guideline, if present, the viscosity of thickener within the present composition ranges from about 0.1 wt % to about 3 wt %, from about 0.1 wt % to about 2 wt %, or about 0.1 wt % to about 0.5 wt %.

Dyes and Fragrances

Various dyes, odorants including perfumes, and other aesthetic enhancing agents may also be included in the detergent composition. Dyes may be included to alter the appearance of the composition, as for example, any of a variety of FD&C dyes, D&C dyes, and the like. Additional suitable dyes include Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Aniline and Chemical), Metanil Yellow (Keystone Aniline and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), Pylakor Acid Bright Red (Pylam), and the like. Fragrances or perfumes that may be included in the compositions include, for example, terpenoids such as citronellol, aldehydes such as amyl cinnamaldehyde, a jasmine such as C1S-jasmine or jasmal, vanillin, and the like.

Bleaching Agents

The detergent composition can optionally include a bleaching agent for lightening or whitening a surface, and can include bleaching compounds capable of liberating an active halogen species, such as $Cl_2$, $Br_2$, —OCl— and/or —OBr—, or the like, under conditions typically encountered during the cleansing process. Examples of suitable bleaching agents include, but are not limited to: chlorine-containing compounds such as chlorine, a hypochlorite or chloramines. Examples of suitable halogen-releasing compounds include, but are not limited to: alkali metal dichloroisocyanurates, alkali metal hypochlorites, monochloramine, and dichloroamine. Encapsulated chlorine sources may also be used to enhance the stability of the chlorine source in the composition (see, for example, U.S. Pat. Nos. 4,618,914 and 4,830,773, the disclosures of which are incorporated by reference herein). The bleaching agent may also include an agent containing or acting as a source of active oxygen. The active oxygen compound acts to provide a source of active oxygen and may release active oxygen in aqueous solutions. An active oxygen compound can be inorganic, organic or a mixture thereof. Examples of suitable active oxygen compounds include, but are not limited to: peroxygen compounds, peroxygen compound adducts, hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine.

Sanitizers/Anti-Microbial Agents

The detergent composition can optionally include a sanitizing agent (or antimicrobial agent). Sanitizing agents, also known as antimicrobial agents, are chemical compositions that can be used to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, anilides, organosulfur and sulfur-nitrogen compounds and miscellaneous compounds.

The given antimicrobial agent, depending on chemical composition and concentration, may simply limit further proliferation of numbers of the microbe or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Examples of suitable antimicrobial agents include, but are not limited to, phenolic antimicrobials such as pentachlorophenol; orthophenylphenol; chloro-p-benzylphenols; p-chloro-m-xylenol; quaternary ammonium compounds such as alkyl dimethylbenzyl ammonium chloride; alkyl dimethylethylbenzyl ammonium chloride; octyl decyldimethyl ammonium chloride; dioctyl dimethyl ammonium chloride; and didecyl dimethyl ammonium chloride. Examples of suitable halogen containing antibacterial agents include, but are not limited to: sodium trichloroisocyanurate, sodium dichloro isocyanate (anhydrous or dihydrate), iodine-poly(vinylpyrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, and tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties.

It should also be understood that active oxygen compounds, such as those discussed above in the bleaching agents section, may also act as antimicrobial agents, and can even provide sanitizing activity. In fact, in some embodiments, the ability of the active oxygen compound to act as an antimicrobial agent reduces the need for additional antimicrobial agents within the composition. For example, percarbonate compositions have been demonstrated to provide excellent antimicrobial action.

Activators

In some embodiments, the antimicrobial activity or bleaching activity of the detergent composition can be enhanced by the addition of a material which, when the detergent composition is placed in use, reacts with the active oxygen to form an activated component. For example, in some embodiments, a peracid or a peracid salt is formed. For example, in some embodiments, tetraacetylethylene diamine can be included within the detergent composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof. In some embodiments, an activator for an active oxygen compound combines with the active oxygen to form an antimicrobial agent.

The detergent compositions and methods of use of the present invention may include a bleach activator which allows the liberation of active oxygen species at a lower temperature. Numerous examples of bleach activators of this type, often also referred to as bleach precursors, are known in the art and amply described in the literature such as U.S. Pat. Nos. 3,332,882 and 4,128,494, herein incorporated by reference in their entirety. Preferred bleach activators are tetraacetyl ethylene diamine (TAED), sodium nonanoyloxybenzene sulphonate (SNOBS), glucose pentaacetate (GPA), tetraacetylmethylene diamine (TAMD), triacetyl cyanurate, sodium sulphonyl ethyl carbonic acid ester, sodium acetyloxybenzene and the mono long-chain acyl tetraacetyl glucoses as disclosed in WO-91/10719, but other activators, such as choline sulphophenyl carbonate (CSPC), as disclosed in U.S. Pat. Nos. 4,751,015 and 4,818,426 can also be used herein incorporated by reference in their entirety.

Peroxybenzoic acid precursors are known in the art as described in GB-A-836,988, herein incorporated by reference. Examples of suitable precursors are phenylbenzoate, phenyl p-nitrobenzoate, o-nitrophenyl benzoate, o-carboxyphenyl benzoate, p-bromophenyl benzoate, sodium or potassium benzoyloxy benzene sulfonate and benzoic anhydride. Preferred peroxygen bleach precursors are sodium p-benzoyloxy-benzene sulfonate, N,N,N,N-tetraacetyl ethylene diamine (TEAD), sodium nonanoyloxybenzene sulfonate (SNOBS) and choline sulfophenyl carbonate (CSPC). The amounts of bleach activator in the detergent compositions of the present invention preferably do not exceed wt. %, more preferably 20 wt. %, and most preferably 10 wt. %.

In some embodiments, the detergent composition is in the form of a solid block, and an activator material for the active oxygen is coupled to the solid block. The activator can be coupled to the solid block by any of a variety of methods for coupling one solid detergent composition to another. For example, the activator can be in the form of a solid that is bound, affixed, glued or otherwise adhered to the solid block. Alternatively, the solid activator can be formed around and encasing the block. By way of further example, the solid activator can be coupled to the solid block by the container or package for the detergent composition, such as by a plastic or shrink wrap or film.

Builders or Fillers

The detergent composition can optionally include a minor but effective amount of one or more of a filler which does not necessarily perform as a cleaning agent per se, but may cooperate with a cleaning agent to enhance the overall cleaning capacity of the composition. Examples of suitable fillers include, but are not limited to: sodium sulfate, sodium chloride, starch, sugars, and $C_1$-$C_{10}$ alkylene glycols such as propylene glycol.

Defoaming Agents

The detergent composition can optionally include a minor but effective amount of a defoaming agent for reducing the stability of foam. Examples of suitable defoaming agents include, but are not limited to: silicone compounds such as silica dispersed in polydimethylsiloxane, fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Anti-Redeposition Agents

The detergent composition can optionally include an additional anti-redeposition agent capable of facilitating sustained suspension of soils in a cleaning solution and preventing the removed soils from being redeposited onto the surface being cleaned. Examples of suitable anti-redeposition agents include, but are not limited to: fatty acid amides, fluorocarbon surfactants, complex phosphate esters, polyacrylates, styrene maleic anhydride copolymers, and cellulosic derivatives such as hydroxyethyl cellulose, hydroxypropyl cellulose.

Additional Stabilizing Agents

The detergent composition may also include further stabilizing agents. Examples of suitable stabilizing agents include, but are not limited to: borate, calcium/magnesium ions, propylene glycol, and mixtures thereof.

Dispersants

The detergent composition may also include dispersants. Examples of suitable dispersants that can be used in the solid detergent composition include, but are not limited to: maleic acid/olefin copolymers, polyacrylic acid, and mixtures thereof.

Hardening Agents/Solubility Modifiers

The detergent composition may include a minor but effective amount of a hardening agent. Examples of suitable hardening agents include, but are not limited to: an amide such stearic monoethanolamide or lauric diethanolamide, an alkylamide, a solid polyethylene glycol, a solid EO/PO block copolymer, starches that have been made water-soluble through an acid or alkaline treatment process, and various inorganics that impart solidifying properties to a heated composition upon cooling. Such compounds may also vary the solubility of the composition in an aqueous medium during use such that the cleaning agent and/or other active ingredients may be dispensed from the solid composition over an extended period of time.

Adjuvants

The detergent composition can also include any number of adjuvants. Specifically, the detergent composition can include stabilizing agents, wetting agents, foaming agents, corrosion inhibitors, biocides and hydrogen peroxide among any number of other constituents which can be added to the composition. Such adjuvants can be pre-formulated with the present composition or added to the system simultaneously, or even after, the addition of the present composition. The detergent composition can also contain any number of other constituents as necessitated by the application, which are known and which can facilitate the activity of the present compositions.

Surfactants

The detergent composition can also include additional surfactants. Additional surfactants can include, nonionic surfactants, semi-polar nonionic surfactants, cationic surfactants, anionic surfactants, amphoteric surfactants, zwitterionic surfactants, and combinations of the same.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Tetronic® compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

3. Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol™ manufactured by Shell Chemical Co. and Alfonic™ manufactured by Vista Chemical Co.

4. Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol™ manufactured by Henkel Corporation and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

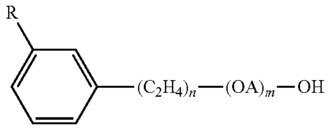

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $—(C_2H_4O)_xH$, where x is in the range of from 1 to 3.

13. A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}—(PO)_SN\text{-}(EO)_tH$, $R^{20}—(PO)_SN\text{-}(EO)_tH(EO)_tH$, and $R^{20}—N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}—(PO)v\text{-}N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

14. Amine oxides are tertiary amine oxides corresponding to the general formula:

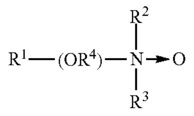

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

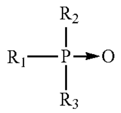

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

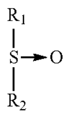

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-$(EO)_5(PO)_4$) and Dehypon LS-36 (R-$(EO)_3(PO)_6$); and capped alcohol alkoxylates, such as Plurafac LF221 and Tegoten EC11; mixtures thereof, or the like.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionics are excellent detersive surfactants and are therefore favored additions to heavy duty detergent compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

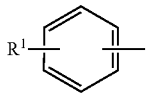
, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

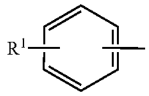

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y—and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

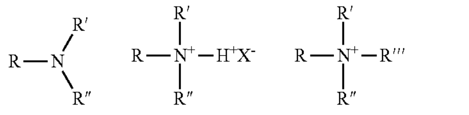

in which, R represents an alkyl chain, R', R", and R"' may be either alkyl chains or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_mR^2_xY_LZ$ wherein each $R^1$ is an organic group containing a straight or branched alkyl or alkenyl group optionally substituted with up to three phenyl or hydroxy groups and optionally interrupted by up to four of the following structures:

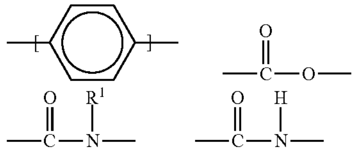

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. Y is can be a group including, but not limited to:

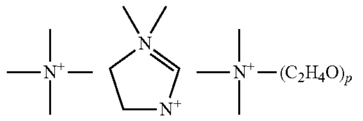

p = about 1 to 12

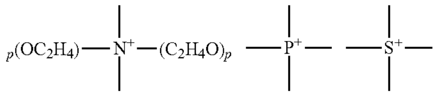

p = about 1 to 12

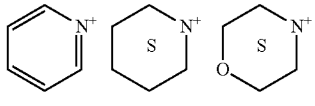

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

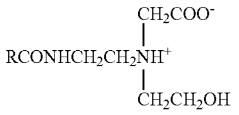

(MONO)ACETATE

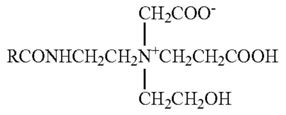

(DI)PROPIONATE

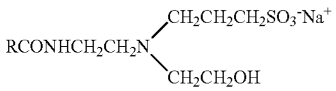

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na$)$_2$—$CH_2$—$CH_2$—OH or $C_{12}$-alkyl-C(O)—N(H)—$CH_2$—$CH_2$—$N^+$($CH_2$—$CO_2Na$)$_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

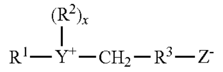

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecypammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

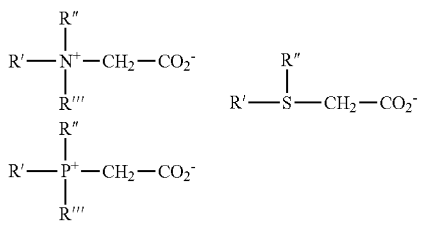

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2\ N^+\ R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

EXEMPLARY EMBODIMENTS

A nonexhaustive exemplary range of ingredients in detergent compositions according to the invention are shown in Table 2 in weight percentage of active ingredients of the liquid detergent compositions.

TABLE 2

| Ingredient | Wt. % |
|---|---|
| Dense Ash | 75-95 |
| Nonionic Block Copolymer | 1-8 |
| Water | 1-10 |
| Polymaleic Acid Homopolyer | 0-5 |
| Polyacrylic Acid Copolymer | 0-5 |
| Maleic Anhydride/Olefin Copolymer | 0.05-3 |

The detergent compositions may include concentrate compositions or may be diluted to form use compositions. In general, a concentrate refers to a composition that is intended to be diluted with water to provide a use solution that contacts an object to provide the desired cleaning, rinsing, or the like. The detergent composition that contacts the articles to be washed can be referred to as a concentrate or a use composition (or use solution) dependent upon the formulation employed in methods according to the invention. It should be understood that the concentration of the polymer system, alkalinity source, nonionic surfactant, water, and other optional functional ingredients in the detergent composition will vary depending on whether the detergent composition is provided as a concentrate or as a use solution.

A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water. In a use solution, the detergent composition is present between about 10 ppm and about 10,000 ppm, preferably between about 200 ppm and about 5000 ppm, more preferably between about 500 ppm and about 2000 ppm, and in a most preferred embodiment between about 750 ppm and about 1500 ppm.

In an embodiment of the invention, a use solution of the detergent composition has between about 1 ppm to about 500 ppm polymer system, between about 1 ppm to about 400 ppm nonionic surfactant, and between 10 ppm to about 4000 ppm alkalinity source. In a preferred embodiment of the invention, a use solution of the detergent composition has between about 10 ppm to about 100 ppm polymer system, between about 10 ppm to about 100 ppm nonionic surfactant, and between 100 ppm to about 1500 ppm alkalinity source. In a more preferred embodiment of the invention, a use solution of the detergent composition has between about 20 ppm to about 60 ppm polymer system, between about ppm to about 80 ppm nonionic surfactant, and between 500 ppm and 1000 ppm alkalinity source. In addition, without being limited according to the invention, all ranges recited are inclusive of the numbers defining the range and include each integer within the defined range. In embodiments of the invention, the use solutions described above can be substantially free of phosphorus.

In an aspect of the invention, the detergent composition preferably provides efficacious cleaning at low use dilutions, i.e., require less volume to clean effectively. In an aspect, a concentrated liquid detergent composition may be diluted in water prior to use at dilutions ranging from about 1/16 oz./gal. to about 2 oz./gal. or more. A detergent concentrate that requires less volume to achieve the same or better cleaning efficacy and provides hardness scale control and/or other benefits at low use dilutions is desirable.

Methods of Use

The detergent compositions can be used in various industries, including, but not limited to: warewash (institutional and consumer), food and beverage, health and textile care. In particular, the detergent compositions can be safely used to clean a variety of surfaces, including for example on ceramics, ceramic tile, grout, granite, concrete, mirrors, enameled surfaces, metals including aluminum, brass, stainless steel, glass, plastic and the like. Compositions of the invention may also be used to clean soiled linens such as towels, sheets, and nonwoven webs. As such, compositions of the invention are useful to formulate hard surface cleaners, laundry detergents, oven cleaners, hand soaps, automotive detergents, and warewashing detergents whether automatic or manual. In preferred aspects of the invention, the detergent compositions and methods of use are particularly suited for warewash applications.

The compositions according to the invention can be provided as a solid, liquid, or gel, or a combination thereof. As set forth in the description of the compositions, the detergent compositions can be provided in one or more parts, such as the formulation of the detergent composition to include the polymer system, alkalinity source, nonionic surfactant, and water. Alternatively, a detergent composition may be provided in two or more parts, such that the overall detergent composition is formed in the stabilized use solution upon combination of two or more compositions. Each of these embodiments are included within the following description of the methods of the invention.

In one embodiment, the detergent compositions may be provided as a concentrate such that the detergent composition is substantially free of any added water or the concentrate may contain a nominal amount of water. The concentrate can be formulated without any water or can be provided with a relatively small amount of water in order to reduce the expense of transporting the concentrate. For example, the composition concentrate can be provided as a capsule or pellet of compressed powder, a solid, or loose powder, either contained by a water soluble material or not. In the case of providing the capsule or pellet of the composition in a material, the capsule or pellet can be introduced into a volume of water, and if present the water soluble material can solubilize, degrade, or disperse to allow contact of the composition concentrate with the water. For the purposes of this disclosure, the terms “capsule” and “pellet” are used for exemplary purposes and are not intended to limit the delivery mode of the invention to a particular shape.

When provided as a liquid concentrate composition, the concentrate can be diluted through dispensing equipment using aspirators, peristaltic pumps, gear pumps, mass flow meters, and the like. This liquid concentrate embodiment can also be delivered in bottles, jars, dosing bottles, bottles with dosing caps, and the like. The liquid concentrate composition can be filled into a multi-chambered cartridge insert that is then placed in a spray bottle or other delivery device filled with a pre-measured amount of water.

In yet another embodiment, the concentrate composition can be provided in a solid form that resists crumbling or other degradation until placed into a container. Such container may either be filled with water before placing the composition concentrate into the container, or it may be filled with water after the composition concentrate is placed into the container. In either case, the solid concentrate composition dissolves, solubilizes, or otherwise disintegrates upon contact with water. In a particular embodiment, the solid concentrate composition dissolves rapidly thereby allowing the concentrate composition to become a use composition and further allowing the end user to apply the use composition to a surface in need of cleaning In another embodiment, the solid concentrate composition can be diluted through dispensing equipment whereby water is sprayed at the solid block forming the use solution. The water flow is delivered at a relatively constant rate using mechanical, electrical, or hydraulic controls and the like. The solid concentrate composition can also be diluted through dispensing equipment whereby water flows around the solid block, creating a use solution as the solid concentrate dissolves. The solid concentrate composition can also be diluted through pellet, tablet, powder and paste dispensers, and the like.

Conventional detergent dispensing equipment can be employed according to the invention. For example, commercially available detergent dispensing equipment which can be used according to the invention are available under the name Solid System™ from Ecolab, Inc. Use of such dispensing equipment results in the erosion of a detergent composition by a water source to form the aqueous use solution according to the invention.

The water used to dilute the concentrate (water of dilution) can be available at the locale or site of dilution. The water of dilution may contain varying levels of hardness depending upon the locale. Service water available from various municipalities have varying levels of hardness. It is desirable to provide a concentrate that can handle the hardness levels found in the service water of various municipalities. The water of dilution that is used to dilute the concentrate can be characterized as hard water when it includes at least 1 grain hardness. It is expected that the water of dilution can include at least 5 grains hardness, at least 10 grains hardness, or at least 20 grains hardness.

The methods according to the invention are directed to cleaning a surface, such as ware in a warewash application, having numerous beneficial results, including enhancing detergency of a low-phosphorus, carbonate alkaline detergent composition containing stabilized enzymes, wherein the detergent composition is more effective in removing soils, preventing redeposition of the soils, and maintains low-foaming of the wash water.

In use, a detergent composition is applied to a surface to be washed during a washing step of a wash cycle. A wash cycle may include at least a washing step and a rinsing step and may optionally also include a pre-rinsing step. The wash cycle involves dissolving a detergent composition, which may include according to the invention components such as, for example, a polymer system, an alkalinity source, and a nonionic surfactant, and optionally other functional ingredients such as enzymes, enzyme stabilizers, builders, surfactants, corrosion inhibitors and the like. During the rinsing step, generally warm or hot water flows over the surfaces to be washed. The rinse water may include components such as, for example, surfactants or rinse aids. The detergent composition is intended for use only during the washing step of the wash cycle and is not used during the rinsing step.

According to further embodiments of the invention, the amount of detergent composition needed to clean and remove soils for a particular application of use varies according to the type of cleaning application and the soils encountered in such applications. According to various embodiments of the invention, levels of enzymes in an aqueous use solution are effective at or below approximately 0.1 ppm, 0.5 ppm or 1 ppm. According to alternative embodiments, use levels of enzymes may be as great as 100 ppm, with most applications utilizing enzymes in aqueous use solutions between approximately 0.1-10 ppm.

During the washing step, the detergent composition contacts the surface and works to clean soil and other residue from the surface, such as ware. In addition, the use solution of the detergent composition aids in preventing soils from depositing onto the surface. In an embodiment employing enzymes and enzyme stabilizing agents, the enzyme stabilizing agent and/or enzymes can optionally be added to the washing step of the wash cycle as a separate component or be incorporated in the detergent composition. Thus, in one embodiment, the enzyme stabilizing agent and/or enzymes is introduced into the washing step of a wash cycle independent of a detergent composition. In an aspect, when provided as a separate component, the enzyme stabilizing agent and/or enzymes may be provided at a relatively high level of enzyme stabilizing agent and/or enzymes, up to about 100%, in liquid or solid form and may be introduced manually or automatically.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The materials used in the following Examples are provided herein:

ACUSOL™ 460ND Polymer: a maleic/olefin copolymer, available from the Dow Chemical Company.

ACUSOL® 448: an acrylic acid copolymer, available from the Dow Chemical Company.

ACUSOL® 425: an acrylic acid copolymer, available from the Dow Chemical Company.

BELCLENE 200: a polymaleic acid homopolymer, available from BWA™ Water Additives.

The 50- and 100-cycle warewash testing was performed using six 10 oz. Libbey glasses on a Hobart AM-15 warewash machine and 17 grain water (1 grain=17 ppm). The specifications of the Hobart AM-15 warewash machine are as follows:

Wash tank volume: 53L
Rinse volume: 2.8L
Wash time: 40 sec.
Rinse time: 10 sec.

Example 1: 100-Cycle Film Evaluation for Institutional Warewash Detergents

Apparatus and Materials:

1. Hobart AM-15 warewash machine connected to appropriate water supply;
2. Raburn glass rack;
3. Libbey heat resistant glass tumblers, 10 oz;
4. Cambro Newport plastic tumblers;
5. Titrator and reagents to titrate alkalinity; and
6. Water hardness test kit.

Preparation and Procedure:

Collect 6 clean glasses and 1 new plastic tumbler. Fill dish machine with the appropriate water. Test the water for hardness. Record the value. Turn on tank heaters. Turn on the dish machine and run wash/rinse cycles through the machine until wash temperature of 150-160° F. and rinse temperature of 175-190° F. is reached. Set controller to dispense appropriate amount of detergent into the wash tank. Titrate to verify detergent concentration. Place 6 clean glasses diagonally and one plastic tumbler off-diagonally in the Raburn rack (see figure below for arrangement) and place the rack inside the dish machine. G=glass tumblers, P=plastic tumblers.

| | | | | | |
|---|---|---|---|---|---|
| | | | | | G |
| | | | | G | |
| | | | G | | |
| | | G | | | |
| | G | | | P | |
| G | | | | | |

The ware wash machine automatically dispensed into the ware wash machine the detergent compositions to achieve the desired concentration and maintain the initial concentration. After 100 wash cycles, the glasses and tumblers were allowed to dry overnight and were then graded for spots and film accumulation. The film ratings are based upon the following measurement scale:

| Grade | Spots | Film |
|---|---|---|
| 1 | No spots | No film |
| 2 | Random amount of spots. There are spots but they cover less than ¼ of the glass surface | Trace amounts of film. This is a barely perceptible amount of film that is barely visible under intense spot light conditions, but is not noticeable if the glass is held up to a florescent light source. |
| 3 | ¼ of the glass surface is covered with spots | A slight amount of film is present. The glass appears slightly filmed when help up to a florescent light source. |
| 4 | ½ of the glass surface is covered with spots | A moderate amount of film is present. The glass appears hazy when held up to a florescent light source. |
| 5 | The entire surface of the glass is covered with spots | A heavy amount of filming is present. The glass appears cloudy when held up to a florescent light source. |

Example 2: 50-Cycle Redeposition Experiment for Institutional Warewash Detergents Apparatus and Materials:

1. Hobart AM-15 warewash machine connected to appropriate water supply;
2. Raburn glass rack;
3. Libbey heat resistant glass tumblers, 10 oz;
4. Cambro Newport plastic tumblers;
5. Hot Point Soil;
6. Titrator and reagents to titrate alkalinity; and
7. Water hardness test kit.

Hot Point Soil:

A 50/50 combination of beef stew and hot point soil was used at 4000 ppm. The soil consisted of the following ingredients:

2 cans of Dinty Moore Beef Stew (1360 g)

1 large can of tomato sauce (822 g)

15.5 sticks of Blue Bonnet Margarine (1746 g)

Powdered Milk (436.4 g)

Preparation and Procedure:

Collect 6 clean glasses and 1 new plastic tumbler. Fill dish machine with the appropriate water. Test the water for hardness. Record the value. Turn on tank heaters. Turn on the dish machine and run wash/rinse cycles through the machine until wash temperature of 150-160° F. and rinse temperature of 175-190° F. is reached. Add the appropriate amount of detergent to the wash tank to reach the desired detergent concentration. Add the appropriate amount of hot point food soil to the wash tank for a total of 4000 ppm food soil. Place 6 clean glasses diagonally and one plastic tumbler off-diagonally in the Raburn rack (see figure below for arrangement) and place the rack inside the dish machine. G=glass tumblers, P=plastic tumblers.

| | | | | | |
|---|---|---|---|---|---|
| | | | | | G |
| | | | | G | |
| | | | G | | |
| | | G | | | |
| | G | | | P | |
| G | | | | | |

The appropriate amount of hot point soil was added to achieve and maintain a sump concentration of 4000 ppm of hot point soil. At the same time add the appropriate amount of detergent was added to achieve and maintain the detergent concentration at the desired level. After 50 cycles, the glasses and tumblers were allowed to dry overnight and were then graded for spots and film accumulation. The glasses were stained with coomassie blue to determine protein residue. The grading scale is provided below in Table 3. The results of the 50-cycle test are provided below in Tables 4 and 5.

TABLE 3

| Grade | Spots | Film |
|---|---|---|
| 1 | No spots | No film |
| 2 | Spots at random | 20% of surface covered in film |
| 3 | ¼ glass spotted | 40% of surface covered in film |
| 4 | ½ glass spotted | 60% of surface covered in film |
| 5 | Whole glass spotted | At least 80% of the surface covered in film |

TABLE 4

| | | | | 50 Cycle Testing | | | |
|---|---|---|---|---|---|---|---|
| | Hard-ness | Conc. | Polymer Level | Glass Ratings | | Plastic Ratings | |
| Formula | (gpg) | (ppm) | (ppm) | Film | Protein | Film | Protein |
| 448 | 17 | 1000 | 10-35 | 3 | 3 | 2 | 3 |
| 425 | 17 | 1000 | 10-35 | 3 | 2.5 | 4 | 3.5 |
| 460ND | 17 | 1000 | 10-35 | 3.5 | 2 | 1.5 | 2 |
| B200 | 17 | 1000 | 10-35 | 2.5 | 4 | 2 | 4 |
| B200/448/460ND (1:1:1) | 17 | 1000 | 10-35 | 2.5 | 2.5 | 1.5 | 2.5 |
| B200/460ND (1:1) | 17 | 1000 | 10-35 | 3 | 3.5 | 1.5 | 3.5 |
| 448/460ND (1:1) | 17 | 1000 | 10-35 | 2.5 | 3 | 1.5 | 3 |
| B200/448 (1:1) | 17 | 1000 | 10-35 | 2.5 | 3.5 | 1.5 | 3.5 |
| B200/425/460ND (1:1:1) | 17 | 1000 | 10-35 | 2.5 | 3 | 3 | 3 |
| B200/425N (1:1) | 17 | 1000 | 10-35 | 2.5 | 2.5 | 4.5 | 3 |
| 448/425N (1:1) | 17 | 1000 | 10-35 | 3 | 3 | 4.5 | 3 |
| B200/448/425N (1:1:1) | 17 | 1000 | 10-35 | 2.5 | 3 | 4.5 | 3 |
| B200/448 (high) (1:1) | 17 | 1000 | 36-50 | 2.5 | 3 | 3.5 | 3 |
| B200/425N (high) (1:1) | 17 | 1000 | 36-50 | 3 | 3 | 2.5 | 3 |
| B200/448/460ND (1:1:1) | 17 | 1000 | 36-50 | 2.5 | 2.5 | 3 | 2.5 |
| B200/448/460ND (3:3:1) | 17 | 1000 | 36-50 | 3 | 2.5 | 3 | 2.5 |
| B200/448/460ND (11:11:6) | 17 | 1000 | 10-35 | 2.5 | 2.75 | 2 | 3 |

TABLE 5

| | | | | 100 Cycle Testing | | |
|---|---|---|---|---|---|---|
| | | | Polymer | Glass Ratings | | Plastic |
| Formula | Hardness (gpg) | Conc. (ppm) | Level (ppm) | Film | Fiji Rating | Ratings Film |
| 448 | 17 | 1000 | 10-35 | 3 | 31900 | 2.5 |
| 425 | 17 | 1000 | 10-35 | 3.5 | 38399 | 2.5 |
| 460ND | 17 | 1000 | 10-35 | 5 | 65520 | 5 |
| B200 | 17 | 1000 | 10-35 | 2.5 | 30798 | 2.5 |
| B200/448/460ND (1:1:1) | 17 | 1000 | 10-35 | 3.5 | 49002 | 3.5 |
| B200/460ND (1:1) | 17 | 1000 | 10-35 | 4.5 | 58784 | 4.5 |
| 448/460ND (1:1) | 17 | 1000 | 10-35 | 4 | 49171 | 4 |
| B200/448 (1:1) | 17 | 1000 | 10-35 | 3 | 34057 | 3 |
| B200/425/460ND (1:1:1) | 17 | 1000 | 10-35 | 3.5 | 45193 | 3.5 |
| B200/425N (1:1) | 17 | 1000 | 10-35 | 3 | 40186 | 2 |
| 448/425N (1:1) | 17 | 1000 | 10-35 | 3.5 | 47333 | 2.5 |
| B200/448/425N (1:1:1) | 17 | 1000 | 10-35 | 3.5 | 45202 | 2 |
| B200/448 (high) (1:1) | 17 | 1000 | 36-50 | 2.5 | 28629 | 2.5 |
| B200/425N (high) (1:1) | 17 | 1000 | 36-50 | 2.5 | 28143 | 2.5 |
| B200/448/460ND (1:1:1) | 17 | 1000 | 36-50 | 3.5 | 39290 | 3.5 |
| B200/448/460ND (3:3:1) | 17 | 1000 | 36-50 | 2.75 | 32017 | 2.5 |
| B200/448/460ND (11:11:6) | 17 | 1000 | 10-35 | 3.75 | 38193 | 2 |

The inventions being thus described, it will be obvious that the same may be varied in many ways. Such variations are not to be regarded as a departure from the spirit and scope of the inventions and all such modifications are intended to be included within the scope of the following claims.

The invention claimed is:

1. A concentrated detergent comprising:

a polymer system comprising at least one polymaleic acid homopolymer, at least one acrylic copolymer, and at least one maleic anhydride/olefin copolymer; wherein said polymaleic acid homopolymer is present between about 25 wt. % and about 55 wt. % of the polymer system, and said maleic anhydride/olefin copolymer is present between about 5 wt. % and about 35 wt. % of the polymer system;

an alkalinity source comprising an alkali metal carbonate and/or alkali metal hydroxide;

an enzyme;

a nonionic surfactant; and water;

wherein said detergent has an alkaline pH; and wherein said polymaleic acid homopolymer, acrylic acid copolymer, and maleic anhydride/olefin copolymer are present in a ratio between about 1:1:1 to about 3:3:1.

2. The detergent of claim 1, wherein said polymer system comprises at least two polycarboxylic acid polymers, copolymers, or terpolymers.

3. The detergent of claim 1, wherein said polymaleic acid homopolymer, acrylic acid copolymer, and maleic anhydride/olefin copolymer are present in a ratio between about 1:1:1 to about 2:2:1.

4. The detergent of claim 1, wherein said acrylic acid copolymer is present between about 25 wt. % and about 55 wt. % of the polymer system.

5. The detergent of claim 1, wherein said detergent composition comprises between about 0.01 wt. % and about 20 wt. % polymer system, between about 50 wt. % and about 99 wt. % alkalinity source, between about 0.01 wt. % and about 15 wt. % nonionic surfactant, and between about 0.01 wt. % and about 20 wt. % water.

6. The detergent of claim 1, wherein said detergent is substantially free of phosphorus.

7. The detergent of claim 1, wherein the polymers, copolymers, and/or terpolymers of the polymer system have molecular weights between about 100 and about 10,000.

8. The detergent of claim 1, wherein said detergent contains at least one additional functional ingredient selected from the group consisting of defoaming agents, anti-redeposition agents, bleaching agents, enzymes, surfactants, solubility modifiers, dispersants, rinse aids, metal protecting agents, stabilizing agents, corrosion inhibitors, additional sequestrants and/or chelating agents, fragrances and/or dyes, rheology modifiers or thickeners, hydrotropes or couplers, buffers, solvents, and combinations thereof.

9. A method of using a concentrated detergent of claim 1 comprising:

forming a use solution with said concentrated detergent;

contacting a surface with said use solution;

cleaning said surface with said use solution.

10. The method of claim 9, wherein said warewash detergent is substantially free of phosphorus.

11. The method of claim 9, wherein said warewash detergent is present in the use solution between about 200 ppm and about 10,000 ppm.

12. The method of claim 9, wherein said warewash detergent is present in the use solution between about 500 ppm and about 4000 ppm.

13. The method of claim 9, wherein said polymer system is present in the use solution between about 1 and about 500 ppm.

14. The method of claim 9, wherein said surface is a ware.

15. The method of claim 9, wherein said method provides substantially similar cleaning performance to a method employing a phosphorus-containing detergent.

16. The detergent of claim 1, wherein said polymaleic acid homopolymer is present in an amount of between about 0 wt. % and about 5 wt. % of the concentrated detergent, said polyacrylic acid copolymer is present in an amount of between about 0 wt. % and about 5 wt. % of the concentrated detergent, and said maleic anhydride/olefin copolymer is present in an amount of between about 0.05 wt. % and about 3 wt. % of the concentrated detergent.

* * * * *